United States Patent Office 2,719,110
Patented Sept. 27, 1955

2,719,110

REFINING PETROLEUM FRACTIONS

Louis D. Rampino, Associated, Calif., assignor to Tide Water Associated Oil Company, San Francisco, Calif., a corporation of Delaware No Drawing. Application October 26, 1951, Serial No. 253,467

1 Claim. (Cl. 196—38)

The present invention relates to a process for purifying and stabilizing petroleum fractions or materials derived therefrom. More particularly, it relates to treating such materials, e. g., heavy catalytically cracked naphthas, in a process comprising contacting with, among other materials, potassium hydroxide under specified conditions of temperature and concentration.

In the refining of petroleum fractions or materials derived therefrom, it is often desirable to manufacture products which are relatively stable after storage in the presence of air for extended periods of time, as determined by accepted oxidation and gum formation tests. It is also desirable to produce purified hydrocarbon materials substantially free from certain contaminants which tend to cause objectionable discoloration in blends of commercial products such as gasolines, solvents, jet aircraft fuels, and the like. With regard to gasolines and other fuels suitable for use in internal combustion engines, it is equally important that said fuels be so purified and stabilized that a minimum of engine fouling results from their present or future use over extended periods of operation, and that said use be accompanied by no appreciable increase in engine wear. Also, it will be appreciated that it is economically necessary to carry out the various refining steps with a minimum of treating losses of valuable material.

Numerous processes have been proposed in the past to produce desirable quality end products. A much used process of today comprises essentially a concentrated sulfuric acid treatment. Although satisfactory products are manufactured by this treatment, it has the serious inherent disadvantage, among other things, of polymerizing conjugated diolefins and other dienes with their consequent removal and loss. Furthermore, substantial volume losses of other valuable materials are also inherent in this process, thereby contributing to decreased production of acceptable products.

The present invention provides a process for the manufacture of very high quality products with substantially no undesirable losses of valuable material resulting therefrom. The process comprises essentially a step of contacting the feed stock with concentrated KOH at elevated temperatures in combination with an extraction step with relatively dilute acid, whereby the economic disadvantage of processes suggested by the older art of petroleum refining are minimized.

It is therefore an object of the present invention to provide a new and useful process for the production of stabilized and purified liquid hydrocarbon materials which exhibit improved resistance to gum formation and oxidation on storage.

It is a further object of the present invention to provide a new and useful process for the production of stabilized and purified liquid hydrocarbon materials which when used as fuels, or components thereof, for internal combustion engines will avoid fouling of said engines after many hours of service under strenuous operating conditions.

It is a further object of the present invention to provide a new and useful process for the removal of contaminants and materials deleterious to the desired water-white color quality often required of various petroleum products.

It is a further object of the present invention to provide a new and useful process for treating highly cracked petroleum fractions in which volume losses are extremely small and from which the resulting products may be blended with other components to produce finished gasolines having excellent susceptibility to conventional gasoline gum- inhibitors.

Heretofore, it has been generally thought that materials such as olefins, and especially conjugated diolefins, contribute in large measure to excessive gum formation in products. Consequently, particular attention has been directed by the art toward substantially removing these substances, and the losses of valuable materials resulting from their removal has long been accepted as inherent in refining operations.

Now, I have discovered in using, among other materials, heavy catalytically cracked naphthas containing diolefins (2–3%) that this amount of diolefins is not detrimental either to satisfactory storage stability or to engine cleanliness and may be retained with resulting increase of yield, provided that certain other gum-forming constituents, such as, certain phenolic, sulfur and nitrogen compounds, are removed.

Furthermore, I have found that certain non-basic nitrogen compounds, such as pyrroles, which are relatively immune to dilute acid treatment, may be removed from naphtha fractions by treatment with KOH at elevated temperatures. The present invention is applicable to various types of cracked hydrocarbon materials, particularly those in the heavy naphtha range. It is found to be especially effective in the refining of heavy catalytically cracked naphthas containing, besides aromatics, naphthenes, paraffins and olefins, such classes of materials as conjugated diolefins and other dienes, sulfur compounds, phenolic-type compounds, and introgen compounds including pyrroles and other non-basic nitrogen.

An example of the petroleum fractions to which the present process may be applied, is a heavy catalytically cracked naphtha fraction having the following characteristics:

Boiling range _____ 270–444° F.
API gravity _____ 36.2–37.2.

Bromine number _____ 32–65.
Maleic anhydride number _____ 12–30.
Percent unsaturates+aromatics _____ 60.0–76.8.
Percent nitrogen _____ 0.043–0.072.
Percent sulfur _____ 0.21–0.40.
Percent hydroxyl groups as phenol _____ 0.5–1.0.

In this type of material, about 90% of the nitrogen may be present as basic nitrogen, which is removed for the most part by dilute acid extraction. However, the removal of such materials with dilute acid is insufficient to provide a satisfactory product. The remaining nitrogen material is non-basic of which about 4% are pyrroles. This contaminating material, along with certain sulfur compounds, are effectively removed by the KOH treatment of the present invention, while retaining substantially all the olefins and diolefins.

In practicing the present invention, the hydrocarbon feed stock may first be pretreated with dilute caustic to remove phenolic type compounds. This is advisable primarily for economic reasons in that the more expensive concentrated KOH is not expended in removing relatively large concentrations of phenolic type materials. The strength of caustic used in this pretreat may vary over wide limits, for example, from 10 to 35° Baumé.

A suggested procedure comprises contacting with 10° Baumé NaOH for a period of about 30 minutes, the time depending for the most part on the degree of intimate mixing and agitating with the feed stock. The resulting pretreated material is then contacted with concentrated KOH. The concentration of the KOH used should be not less than 70% (by weight) and sufficient water should be present so that the KOH becomes liquid, i. e. molten, at the contact temperatures. Commercially available pellets containing 85% to 90% (by weight) KOH, the remainder comprising mostly water with small amounts of carbonates and other impurities, are satisfactory for this step. The temperature is maintained within the range of 275° to 400° F., the commercial KOH pellets liquifying around 275°–300° F. After sufficient time for thorough contact, the treated naphtha is separated and then extracted with sulfuric acid to remove basic nitrogen compounds. The strength of $H_2SO_4$ may range from very dilute to about 40% (by weight) $H_2SO_4$. As the concentration approaches 50%, the material losses due to diolefin polymerization, sludge formation, and so forth sharply increase. Consequently the lower ranges of concentration are recommended to avoid loss of valuable material. It is found that very satisfactory results are obtainable with sulfuric acid of about 8%–10% (by weight) concentration.

Since it is customary in refinery operation to cut a relatively wide stock for chemical treatment and then redistill to a final end point after such treatment, such procedure is contemplated within the scope of the invention and redistillation can conveniently be made after the dilute acid step.

While a particular embodiment of the present invention is found in performing the process steps in the above order, it will be appreciated that said steps may be suitably interchanged while still retaining many of the inherent advantages of the invention. For example, the heavy catalytically cracked naphtha may first be treated with dilute acid. The naphtha therefrom is then contacted with concentrated KOH, with or without a dilute caustic pretreatment step intervening.

The following examples serve to illustrate several aspects of the present invention:

*Example I*

Heavy catalytically cracked naphtha is contacted in a mechanical agitator with 10% by volume of 10° Baumé NaOH for 30 minutes at room temperature. The caustic layer is settled and withdrawn while the hydrocarbon layer is passed into a second agitator wherein it is brought in contact with KOH pellets (assaying approximately 85% by wt. KOH) at the rate of 3 pounds of pellets per barrel of naphtha and heated, under resulting pressure, to 300° F. and such temperature maintained during agitation for 20 minutes. The concentrated KOH layer settles and is withdrawn while the hydrocarbon layer passes into a third agitator wherein it is extracted at atmospheric temperature with 5% by volume of dilute $H_2SO_4$ of 9 weight percent strength. The treated oil is then distilled to a 410° F. end point and is used as a blending component, in this case, in the ratio of 21 volumes of raffinate with 79 volumes of synthetic blending stock. An inhibitor (N-N'di-secondary butyl paraphenylene diamine) is then added at the rate of 2.5 pounds per 1000 barrels.

*Example II*

The procedure of Example I is used except that 35° Baumé NaOH is used in lieu of 10° Baumé NaOH.

*Example III*

The procedure of Example I is used except that the temperature of contact with the KOH pellets is 350° F. in lieu of 300° F.

*Example IV*

The procedure of Example I is used except that 70% KOH is used instead of 85% KOH and the temperature of contact with the KOH is 275° F. in lieu of 300° F.

*Example V*

The procedure of Example I is used except that the dilute NaOH treating step is purposely omitted.

*Example VI*

Heavy catalytically cracked naphtha is contacted in a mechanical agitator with 5% by volume of dilute $H_2SO_4$ of 9 wt. percent strength for 30 minutes at room temperature. The acid layer settles and is removed while the hydrocarbon layer passes into a second agitator wherein it is brought in contact with 10% by volume of 10° Baumé NaOH for 30 minutes at room temperature. The caustic layer settles and is recycled while the hydrocarbon layer passes into a third agitator where it is contacted with KOH pellets (85% KOH, minimum assay) for 20 minutes and the temperature maintained at 320° F. The resulting hydrocarbon layer is then distilled to a 410° F. end point and is used as a blending component as in Example I.

*Example VII*

The procedure of Example VI is used except that the dilute NaOH step is purposely omitted.

The accompanying Table A shows a comparison of products manufactured by different processes, including processes known in the art and the specific examples of the present invention described in detail above. In each case the materials were distilled to a 410° F. end point and inhibited with N-N'disecondary butyl paraphenylene diamine. In each case, 21% of the final material is blended with 79% (by volume) of a synthetic blending stock to give a blended aviation gasoline. This synthetic blending stock has the following composition:

| | Per cent |
|---|---|
| Natural gasoline | 12 |
| Straight run isomers | 48 |
| Alkylate | 40 | and satisfies the following specifications:

| | |
|---|---|
| Octane number | Minimum 80. |
| Reid vapor pressure | 5½ to 7 pounds. |
| Per cent evaporated at 167° F | 10–40. |
| Per cent evaporated at 221° F | Minimum 50. |
| Per cent evaporated at 275° F | Minimum 90. |
| End point | Maximum 338° F. |
| Residue | Maximum 1½%. |
| Color (Saybolt) | Minimum +20. |

TABLE A

| Treatment | Treating and Polymerization Loss | Color [1] | Cleanliness | | Stability | |
|---|---|---|---|---|---|---|
| | | | Overall | Piston Skirt | 4 Hr. @ 212° F. | 7 Days @ 140° F. |
| Raw feed material. No acid or caustic treatment | 0.0 | D | 70.5 | 4.5 | 22 | 30 |
| 86% $H_2SO_4$ 5#/bbl. plus dil. NaOH | 6.5 | A | 91.0 | 8.0 | 1.2 | 2.2 |
| 9 wt. percent $H_2SO_4$ only | 0.2 | C | 87.5 | 6.5 | 13.6 | 16.8 |
| 35° Baumé NaOH only | 0.3 | C | 77.5 | 4.5 | 16.0 | 20.6 |
| 9 wt. percent $H_2SO_4$ plus 35° Baumé NaOH | 0.5 | C | 87.0 | 6.5 | 6.5 | 9.6 |
| 9 wt. percent $H_2SO_4$ plus NaOH pellets at 375° F | 0.6 | C | 84.5 | 6.0 | 2.0 | 7.0 |
| KOH pellets @ 400° F. No acid or dil. NaOH | 0.5 | B | 82 | 6.0 | 4.5 | 7.0 |
| 10° Baumé NaOH plus 45% KOH @ 280° F, plus 9 wt. percent $H_2SO_4$ | 0.6 | B | 86 | 6.0 | 3.4 | 6.4 |
| 65 wt. percent $H_2SO_4$ plus 10° Baumé NaOH plus KOH pellets at 320° F | 2.0 | A | 93 | 8.5 | 1.0 | 3.0 |
| Example I | 0.7 | A | 93 | 8.5 | 1.0 | 1.2 |
| Example II | 0.7 | A | 92 | 8.5 | 2.0 | 2.0 |
| Example III | 0.7 | A | 91 | 8.2 | 1.9 | 1.8 |
| Example IV | 0.6 | A | 88 | 7.5 | 3.0 | 5.5 |
| Example V | 0.7 | A | 90 | 8.0 | 2.0 | 4.9 |
| Example VI | 0.7 | A | 93.5 | 8.5 | 1.0 | 1.0 |
| Example VII | 0.7 | A | 92 | 8.0 | 1.4 | 3.2 |

[1] A = Almost water white; B = Very light yellow; C = Light yellow; D = Yellow.

In Table A, the treating losses are calculated from the material balances. The engine cleanliness ratings are based on a standard test in use in the automotive and petroleum industries and is generally known as the "40E Chevrolet engine test." In this test an acceptable overall rating is 85 and an acceptable piston skirt rating is 7.5. Further breakdown is as follows:

| | Overall Rating | Piston Skirt Rating |
|---|---|---|
| Fair | 80-85 | 6.5-7.5 |
| Good | 85-90 | 7.5-8.0 |
| Very Good | 90-93 | 8.0-8.5 |
| Excellent | 93-100 | 8.5-10 |

The stability data are expressed in terms of milligrams of ASTM gum formed per 100 cc. of gasoline after heating in oxygen for 4 hours at 212° F. and 7 days at 140° F. respectively. As is well known, the ASTM gum tests are accelerated tests indicating relative gum formation in gasolines during extended storage. It will be appreciated that in the blending of finished gasolines it is the accepted practice in the industry to take full advantage of inhibitors to extend as far as possible freedom from gum-formation. Consequently, in making the comparative stability tests of Table A optimum amounts of inhibitor were added in each case in order that the tests should illustrate the best performance obtainable from each blend. The comparative data clearly indicate that, even in the presence of gum-inhibitors, stocks prepared in accordance with the invention exhibit greatly improved storage stability over those of other processes.

From a comparison of these data, while considering all the qualities of a particular product as representing its overall value, it is apparent that those products manufactured by the process taught in the present invention are superior to those made in other suggested ways, while attaining greater yields of product.

I claim:

The steps in the method of treating heavy, catalytically cracked naphthas containing between 2% and 3% of diolefins and substantial amounts of pyrroles and nitrogen bases to remove the two latter and thus avoid polymerization of the diolefins, which comprises contacting said naphtha in the liquid phase at a temperature between 275° F. and 400° F. with molten KOH containing not more than 30% water under conditions to extract substantially all of the pyrroles while retaining the major portion of the diolefins, in conjunction with contacting said naphtha with sulfuric acid of a strength not exceeding 40% under conditions to extract substantially all of the nitrogen bases while retaining the major portion of the diolefins, in which the feed stock is treated with dilute NaOH from 10° to 35° Baumé and the spent NaOH is separated prior to contacting the naphtha with the KOH.

References Cited in the file of this patent

UNITED STATES PATENTS

| 1,655,068 | McMichael | Jan. 3, 1928 |
| 1,738,518 | Axtell | Dec. 10, 1929 |
| 1,867,908 | Day | July 12, 1932 |
| 1,936,210 | Retailliau | Nov. 21, 1933 |
| 1,949,786 | Dickey | Mar. 6, 1934 |
| 2,033,297 | Pott et al. | Mar. 10, 1936 |
| 2,034,712 | Dolbear | Mar. 24, 1936 |
| 2,623,008 | Kleiss | Dec. 23, 1952 |

FOREIGN PATENTS

| 395,635 | Great Britain | July 20, 1933 |